US007667938B2

(12) United States Patent
Ykema et al.

(10) Patent No.: US 7,667,938 B2

(45) Date of Patent: Feb. 23, 2010

(54) POWER NODE SWITCHING CENTER

(75) Inventors: John I Ykema, Media, PA (US); John P. Barber, Kettering, OH (US); Antonios Challita, Bellbrook, OH (US)

(73) Assignee: SPD Electrical Systems, Philadelphia, PA (US)

( * ) Notice: Subject to any disclaimer, the term of this patent is extended or adjusted under 35 U.S.C. 154(b) by 103 days.

(21) Appl. No.: 11/959,055

(22) Filed: Dec. 18, 2007

(65) Prior Publication Data

US 2009/0154047 A1 Jun. 18, 2009

(51) Int. Cl.
*H02H 3/00* (2006.01)

(52) U.S. Cl. .......................................... 361/62; 361/42

(58) Field of Classification Search ..................... 361/2, 361/8, 42, 62
See application file for complete search history.

(56) References Cited

U.S. PATENT DOCUMENTS 4,025,820 A * 5/1977 Penrod .......................... 361/8
5,933,304 A * 8/1999 Irissou .......................... 361/8
2008/0143462 A1* 6/2008 Belisle et al. ............... 335/201

* cited by examiner

*Primary Examiner*—Danny Nguyen
(74) *Attorney, Agent, or Firm*—Dennis M. Carleton; Fox Rothschild LLP

(57) ABSTRACT

A circuit fault detector and interrupter which consists of parallel current conduction paths, including a path through a mechanical contactor and a path through a power electronics switch. A fault can be detected by a fault detection circuit within 50 microseconds of the occurrence of the fault, causing the mechanical contactor to be opened and the fault current to be commutated via a laminated, low-inductance bus through the power electronics switch. The power electronics switch is thereafter turned off as soon as possible, interrupting the fault current. The fault current can be interrupted within 200 microseconds of the occurrence of the fault, and the device reduces or eliminates arcing when the mechanical contactor is opened.

23 Claims, 12 Drawing Sheets

PNSC TOPOLOGY 20 kA rms Available Fault

Legacy 28 kA let thru 35 ms interruption

PNSC 0.3 kA let thru 40 micro sec interruption

POWER NODE SWITCHING CENTER

BACKGROUND OF THE INVENTION

An electrical power delivery system is a complex system consisting of one or more generators with power flowing through cables to nodes, and then to loads. The functions required of the high-powered nodes are distribution, switching and power management. The functions of conversion and power conditioning are most appropriately handled at the branch level nodes. The node level functions are performed at high-power nodes in prior art legacy systems by circuit breakers and switch gear.

In the event of a fault, a prior art system may permit a high fault current, which has a potential for catastrophic collateral damage and which may also deprive other loads on the same or upwardly connected nodes of energy. When a fault occurs in the prior art system, a circuit breaker upstream from the fault opens. The prior art electromechanical circuit breaker may take up to 50 milliseconds to open for a high fault and 100 or more milliseconds for an intermediate fault. During these transient time periods, the systems upstream of the fault are perturbed. This perturbation is usually exhibited by a significant drop in voltage, particularly in close proximity to the fault, which may result in the voltage dropping to near zero for the period of time between the occurrence of the fault and the opening of the circuit breaker. This means that all loads being supplied by other circuits emanating from a node with a fault will experience a very low or zero voltage condition during the time of the fault. Sensitive loads may malfunction and some loads may become disconnected or may need to be reset or rebooted, causing them to be offline for a period of time significantly longer than the actual fault. This is obviously undesirable for sensitive and critical loads. Other loads may be transferred to alternate sources, which may cause further disturbances to the electrical system. In addition, there may be substantial arcing at the point of fault while the electromechanical circuit breaker is opening.

Such a scenario is shown in FIG. 1. In this example, there are 4 power panels (PP), each with six loads, fed from a load center node (LC). If a fault occurs at F1, with legacy equipment, the 18 loads in power panels #1, #2, and #3 will be deprived of power until the fault is cleared, which may take a minimum of 50 milliseconds and which could take as long as 400 milliseconds. The 6 loads in power panel #4 will be lost because the cable feeding them is faulted.

Therefore, it is desirable to find a replacement for the electromechanical circuit breakers that currently detect and switch off faulted circuits. In particular, it is desirable that the replacement for the electromechanical circuit breaker be able to detect a high fault within about 50 microseconds and be able to interrupt a high fault current in less than 400 microseconds. This represents an approximate thousand-fold increase in speed over prior art legacy systems. It is also desirable that the arcing that traditionally occurs when an electromechanical circuit breaker is opened be minimized or eliminated.

SUMMARY OF THE INVENTION

The power node switching center (PNSC) of the present invention replaces existing upstream circuit breakers with ultra-fast circuit interrupters capable of detecting faults within 50 microseconds and interrupting faults within 400 microseconds.

The power node switching center is a device which has two parallel current paths for each line (or phase). One path consists of power electronic devices which can be gated to switch current on and off very quickly. The second, parallel path consists of a mechanical contactor device which carries current very efficiently and which can open sufficiently quickly to commutate the current to the power electronic path in less than 25 microseconds. This, combined with a low inductance path between the mechanical contacts and the power electronics, eliminates arcing when the mechanical contact is opened. The current then flows through the power electronics path until the power electronics are switched off.

The criteria regarding the time to interrupt the current is dependent upon two conditions. First, that the interruption time is so short that the loss of voltage during the fault will not jeopardize the operation of loads on adjacent circuits and, second, that the magnitude of the fault current will not jeopardize the integrity of the power electronics. This enhances the survivability of loads being fed by adjacent circuits and effectuates a tremendous reduction in collateral damage caused by a fault.

The electromechanical switch consists of a very low resistance contact structure that can open in less then 25 microseconds which consists of coaxial stationary poles, each having multiple contacts, and a lightweight conductive disk that makes electrical contact between the poles of the switch. Upon fault detection, a rapidly acting magnetic system launches the disk away from the poles, thereby opening the circuit. This magnetic system consists essentially of a capacitor, a fast switch and a magnetic pancake coil. The disk has low mass to allow a high acceleration and rapid contact separation.

A low inductance, laminated bus structure between the contactor and the solid state power electronics enables non-arcing commutation of the current from the contactor to the solid state power electronics within 25 microseconds.

This concept eliminates the losses that would be experienced with prior art, electromechanical circuit breakers. The system therefore has an efficiency equal to or better than the electromechanical circuit breaker.

One innovative aspect of the invention is the fault detection circuitry, which is able to detect fault conditions within about 30 microseconds. This is accomplished with a narrow bandwidth, high gain integrator operating on the output of a Rogowski coil current detector.

Another innovative aspect of the invention is in the opening mechanism of the mechanical contactor, which relies on a traditional Thompson drive, combined with very low inductance achieved via the integration of the low mass mechanical contactor and the power electronics switch. The low mass allows the movement of the mechanical contactor at a very high speed and commutation of the current to the power electronics. The current is thus interrupted before it reaches high values, which eliminates the magnetic stress on upstream circuits between the generator and the point of fault. In addition, the voltage on the upstream node is lost for such a short period of time that all loads being fed from the node having the fault or upstream of the node having the fault survive the event and continue to operate normally, and may not even be aware of the occurrence of the fault event.

FIG. 2 shows a comparison between the fault detection and interruption of legacy systems and the power node switching center. As can be seen, for an 85 kA rms fault current, a legacy system will take between 1 and 2 full cycles (30 milliseconds) to detect and interrupt the current. During this time, the fault current could reach 40-50 times the rated load current. The power node switching center can interrupt the current in about 200 microseconds, thereby limiting the current to the load to approximately 2 times the rated load current.

The power node switching center is a device which will distribute, switch and control power at electrical power nodes whose power handling capacity ranges from 0.5 MW to 50 MW, while accurately detecting downstream system faults and stopping the current flow in less then 400 microseconds.

DETAILED DESCRIPTION OF THE INVENTION

The operation of the switching module of the power node switching center PNSC consists of three main functions. These are: (1) detection of a fault current; (2) commutation of the current from a path traversing a mechanical contactor to a path through a power electronics switch; and (3) interruption of the fault current by opening the power electronics switch.

Figure 1:
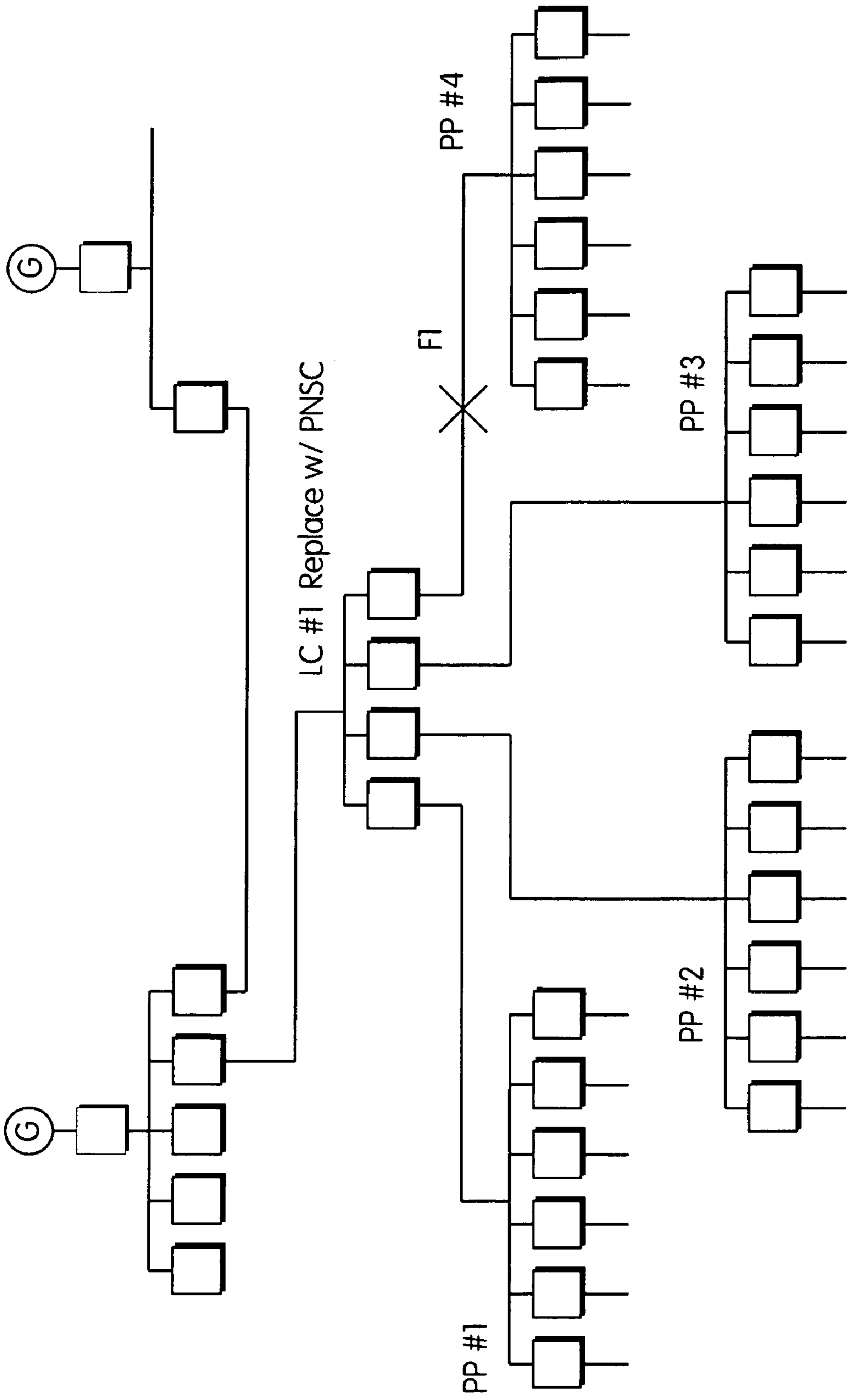
FIG. 1 is a schematic representation of an electrical power system, showing a fault at F1
Figure 2:
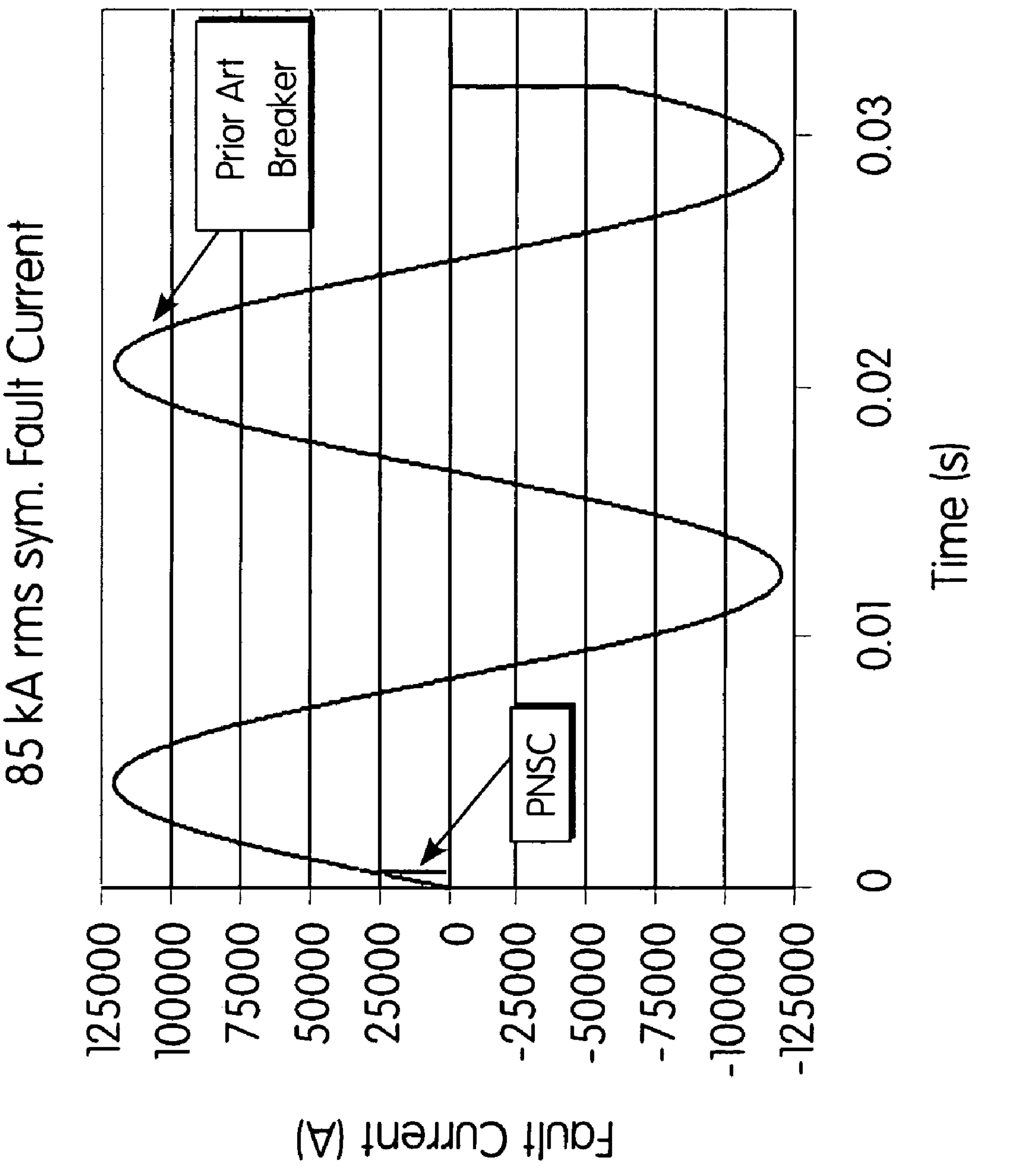
FIG. 2 is a graph showing the response time to fault current interruption with legacy electromechanical circuit breaker and the Power Node Switching Center of the present invention.
Figure 3:
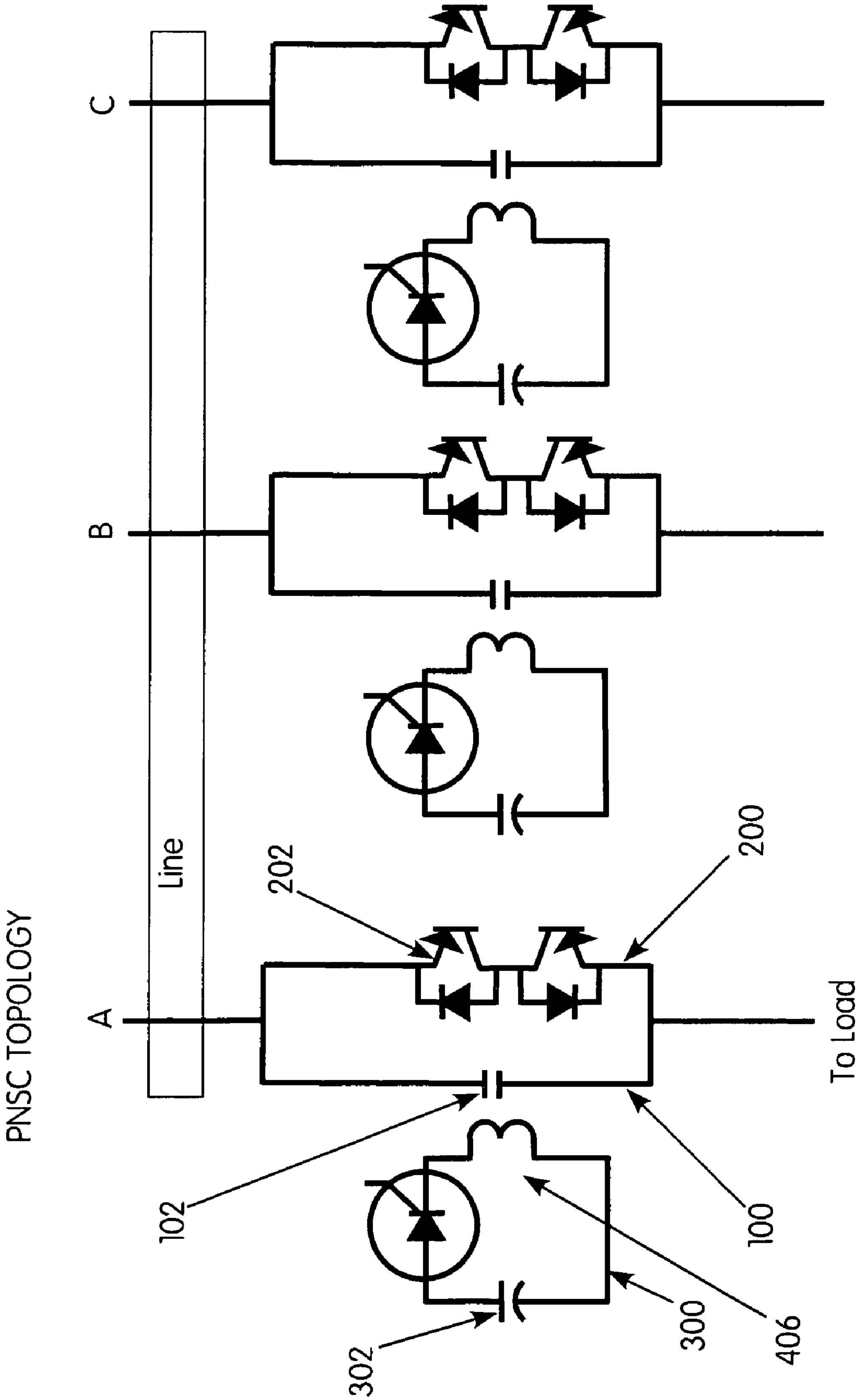
FIG. 3 is a schematic representation of the topology of the switching module of the power node switching center of the present invention.

The basic topology of the PNSC switching module is shown in FIG. 3. FIG. 3 shows the switching module in three phase configuration, in which separate circuits for all three phases would be housed in a single enclosure. This is not meant to be a limitation of the invention, however, as any number of phases could be housed together and still be within the spirit of the invention.

The preferred embodiment of the PNSC switching module consists essentially of two parallel current carrying paths 100 and 200 for each phase. Path 100 includes mechanical contactor 102, and is the primary current carrying path during normal (non-fault) operations. When a fault is detected, discharge circuit 300 is gated, causing mechanical contactor 102 to open by dumping the charge stored in capacitor 302 through pancake coil 406, thereby inducing a repulsive magnetic force between pancake coil 406 and disk 408 (See FIG. 9). As mechanical contactor 102 opens, current is commutated from mechanical path 100 to electronic path 200, and is then conducted via power electronics 202, which may consist of a pair of IGBTs or other power electronic devices. Power electronics 202, in the preferred embodiment, are continuously gated, even during non-fault operation, but in alternate embodiments may be turned off and gated only when a fault is detected.

The connection between mechanical path 100 and power electronic path 200 consists primarily of a laminated bus, which provides a low-inductance connection between paths 100 and 200. This allows for fast commutation of the current from path 100 to path 200. Because of the speed of the commutation, the voltage between the line end and the load end of path 100 does not have time to rise to a level which would result in the ionization of the air in the gap between disk 407 and contacts 402 and 404. This will reduce or eliminate arcing when mechanical contactor 102 is opened.

One novel aspect of the invention is the ability to detect a fault current within a few microseconds of the onset of the fault condition. During a fault condition, the current will rise rapidly. To detect a fault, the detection circuitry looks for an approximate 100 A change in current within a few microseconds. The detector, however, must not confuse a fault current with the normal operating current, which may consist of thousands of amps, normally at 60 Hz. Therefore, the detector must have a narrow bandwidth to detect the fault current, which typically has a high frequency content. The bandwidth for the detector will therefore typically be in the 10 kHz-100 kHz range, allowing the detection of the rise in current within a time range of 1-100 microseconds (1/F), depending upon the magnitude of the fault current.

Figure 4:
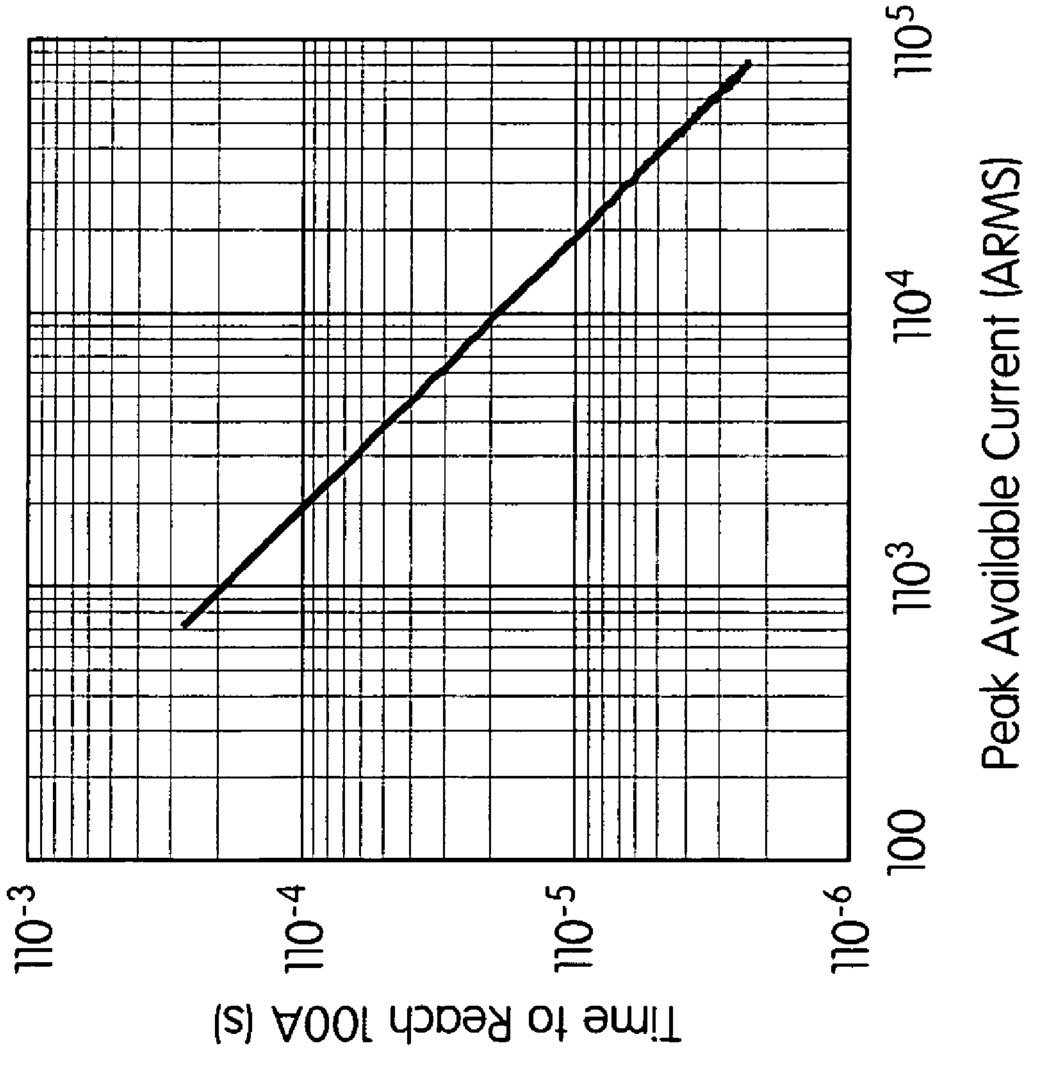
FIG. 4 is a graph showing time to detect a ~100 A change in current versus the peak available current. This graph shows that the higher the peak available current, the less time it will take to detect a ~100 A change.

FIG. 4 shows a graph of the time it takes to detect a 100 A change in current as a function of the peak available fault current. It can be seen that the higher the peak available currents, the shorter the time that is required to detect the change in the current necessary to declare a fault condition.

Figure 5:
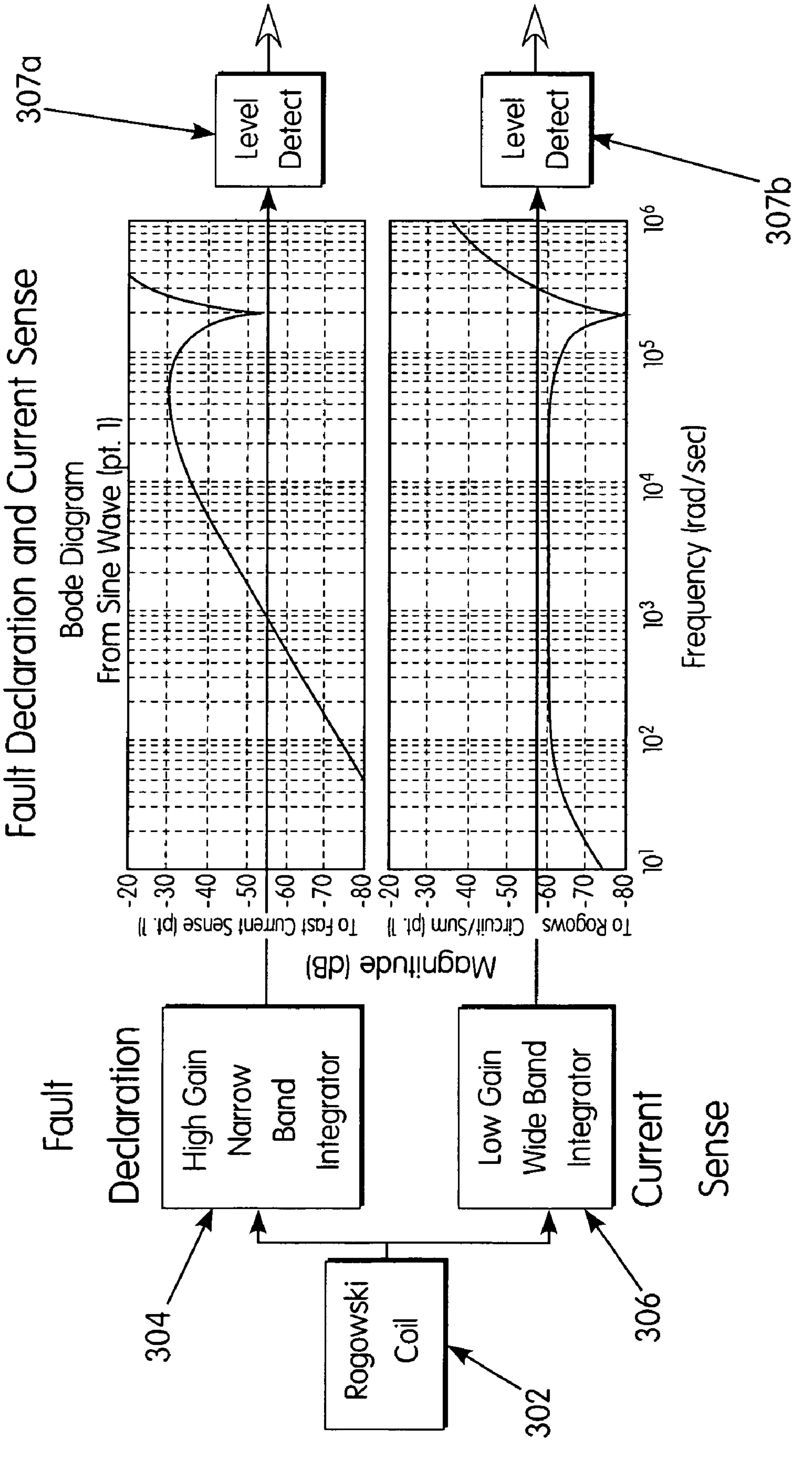
FIG. 5 is a block diagram of the fault detection portion of the invention, showing the frequency response of the integrators.

The current detector of the present invention is shown diagrammatically in FIG. 5. A Rogoswki coil 302 of a type well known in the art will produce a voltage which is proportional to the rate of change of the current flowing through a conductor (dI/dt). This signal is integrated for the purposes of fault detection using a high gain, narrow bandwidth integrator 304, with a passband in the range of 10 kHz-100 kHz. The response of the fault sensor is shown in the top half of FIG. 5. The sensor has a relatively flat response of about −30 dB (32 mV/A) between 20 kHz and 100 kz. At the line frequency of 60 Hz, the integrator is ineffective and the Rogowski output is passed through without being integrated. The gain is 30 dB below the high frequency integrated response, showing that the system is relatively insensitive to line frequency current. The output of the sensor is connected to a level detect circuit 307*a*. If the output voltage of the sensor exceeds the set level, a fault is considered to be present.

The output of the Rogowski coil is also integrated by a low gain, wide bandwidth integrator 306 for line frequency current sensing purposes. The response of this sensor is shown in the bottom half of FIG. 5. The response is flat from about 50 Hz to 100 Hz with a gain of about −60 dB (1 mV/A). This system senses line current over a wide bandwidth, down to line current frequency, but is over 30 times less sensitive than the fault current sensor at high frequencies. The output from this sensor is fed to level detect circuit 307*b*. When the sensor signal exceeds the set level an overload fault is considered to be present. Preferably, the level at which a fault is determined to have occurred will be adjustable.

Figure 6:
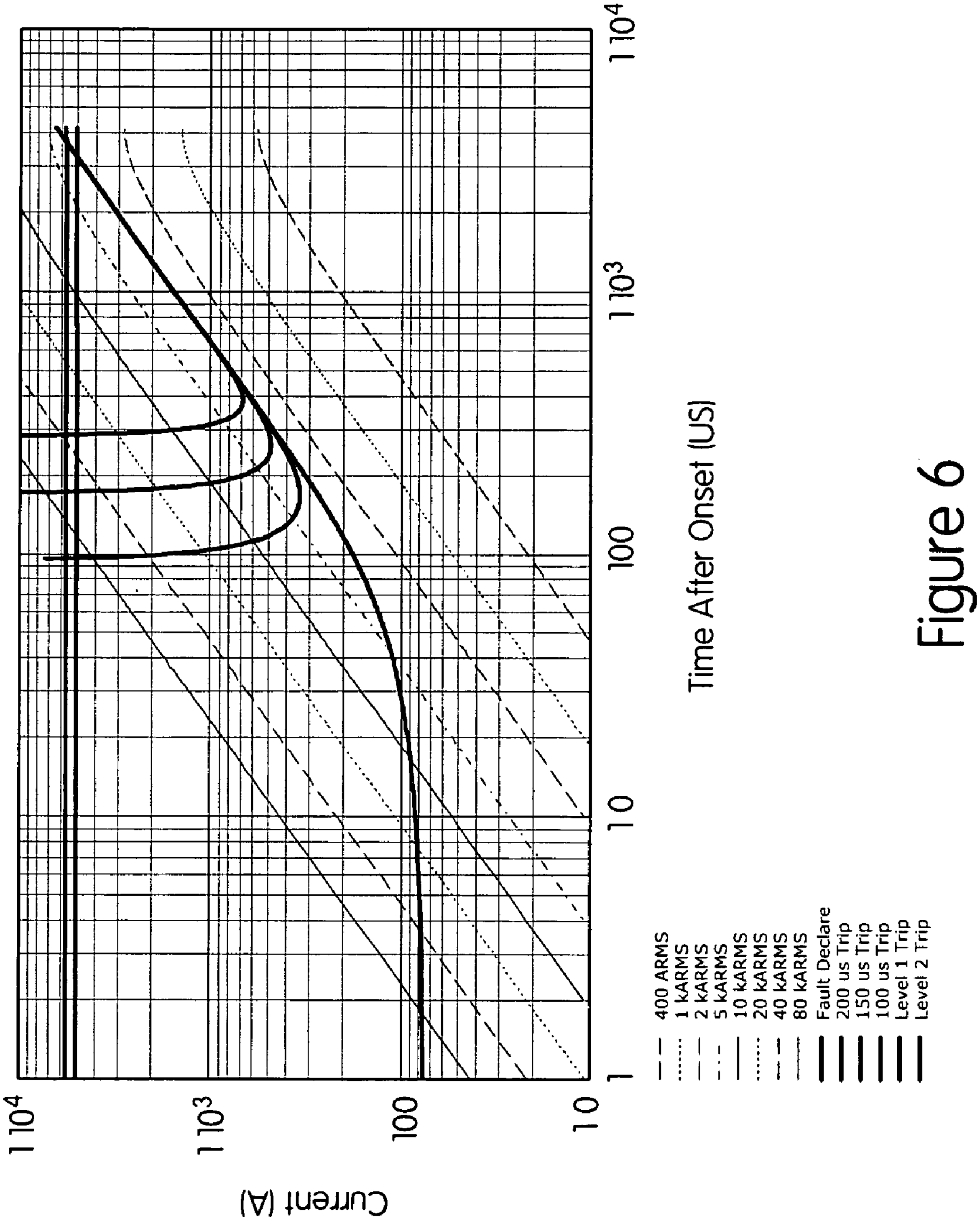
FIG. 6 is graph showing the response of the fault detection circuit for various magnitudes of fault current.
Figure 7:
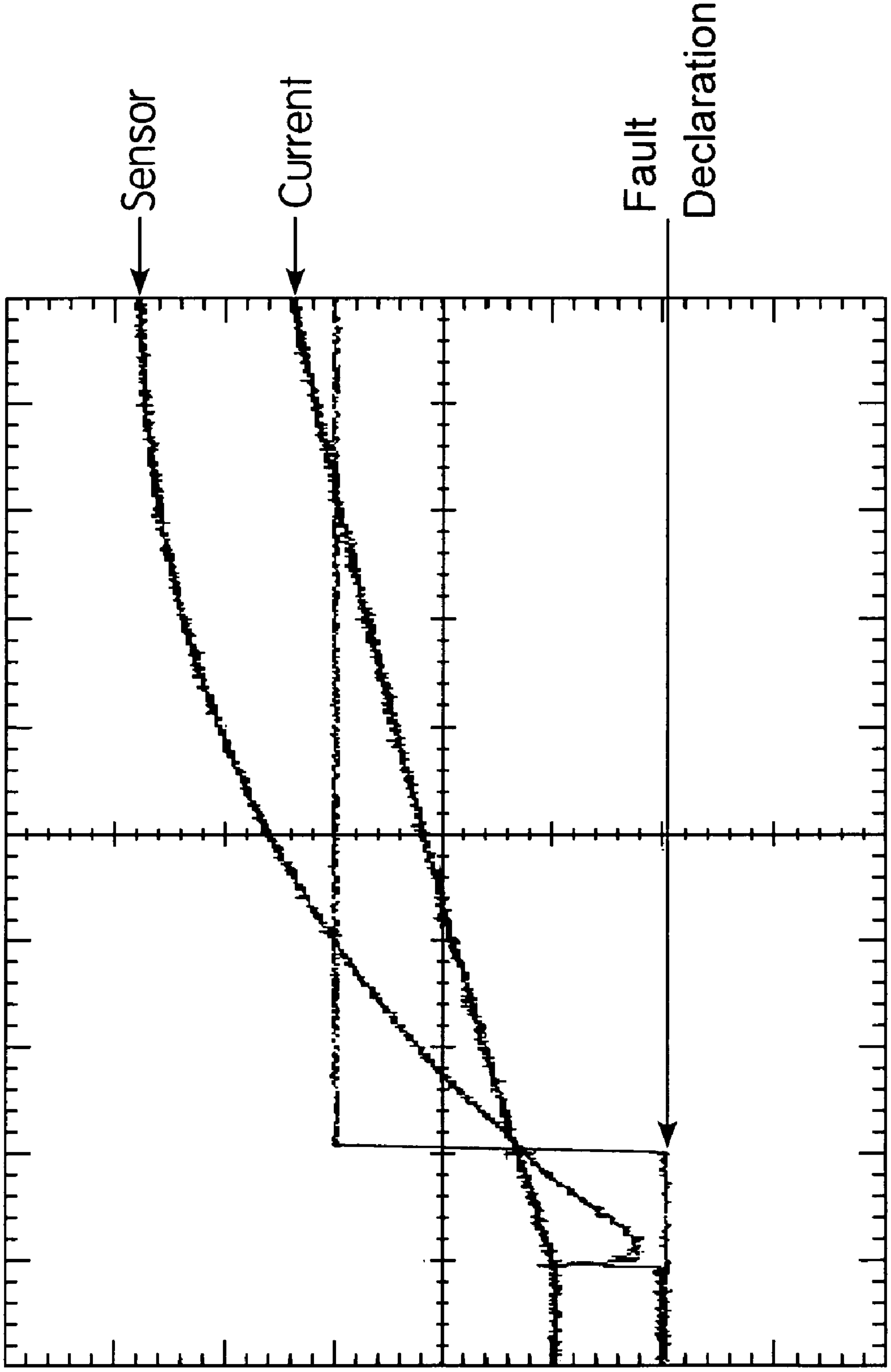
FIG. 7 is a graph showing the point of fault declaration as current rises.

FIG. 6 is a graph showing current versus time after the onset of a fault. The time required for the detection of the fault occurrence is shown where the straight line for the various current levels crosses the "Fault Declare" line. Note that this graph also shows that the time for a fault to be detected is a function of the magnitude of the current. This graph, for example, shows that an available fault current level of 80 kA is able to be detected in less than 2 microseconds, while a fault current of 5 kA is detected within 13 microseconds. FIG. 7 shows the declaration of a fault occurring when the current exceeds the sensor threshold level.

Prior to the detection of the fault, the primary path for current was path 100, through mechanical contactor 102. Once the fault has been detected, mechanical contactor 102 is opened and the current is then commutated to and conducted through path 200 until power electronics 102 can be shut down, thereby stopping the flow of all current.

Figure 8:
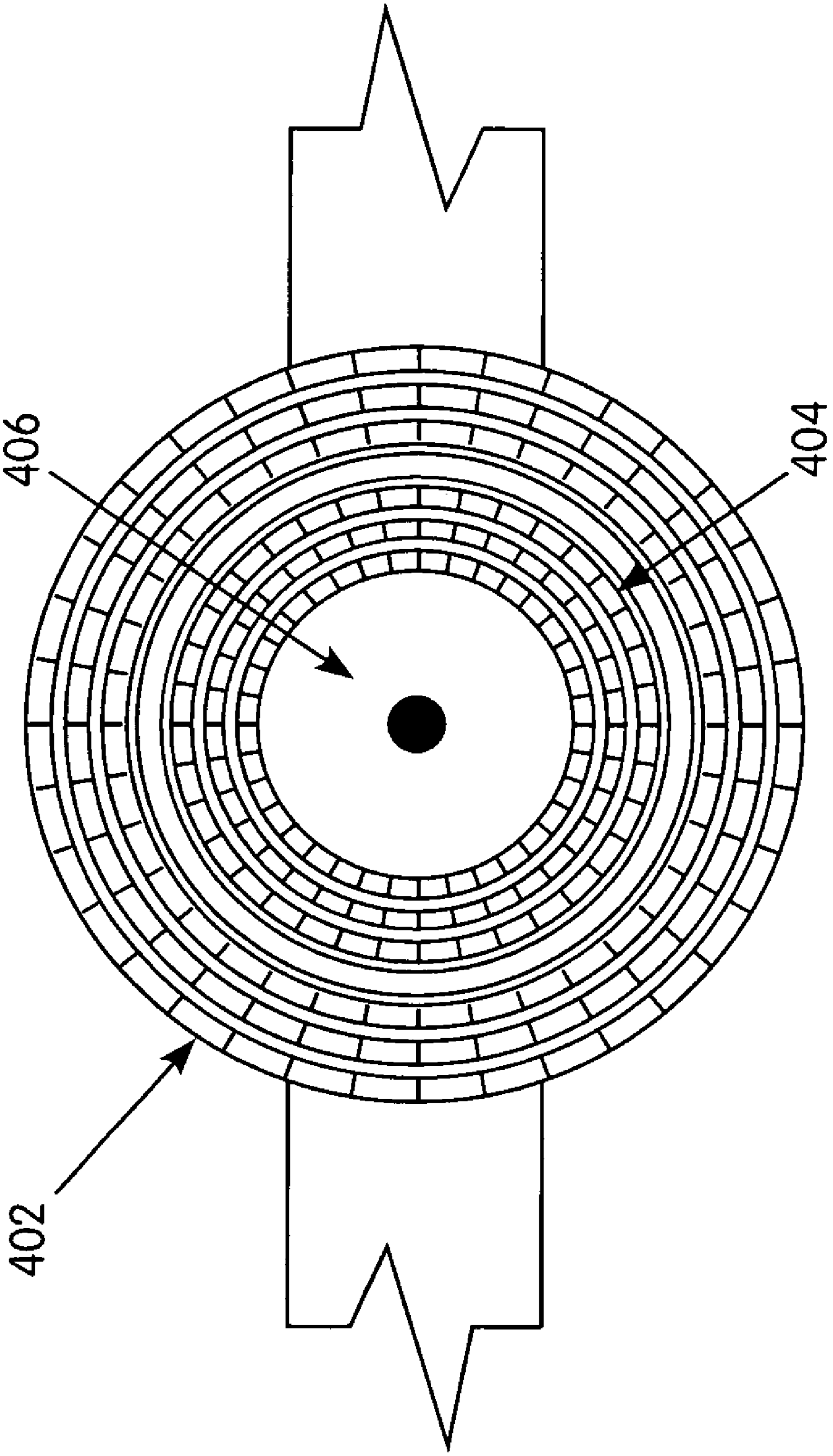
FIG. 8 is a photograph of the stationary contacts and pancake coil of the mechanical contactor of the present invention.

Mechanical contactor 102 is a novel improvement to prior art contactors based on a Thompson Drive. FIG. 8 shows the stationary contacts of mechanical contactor 102. The poles of the contactor are represented by concentric rings of finger-like protrusions labeled in FIG. 8 as outer stationary contacts 402 and inner stationary contacts 404, representing the two poles of the switch. Pancake coil 406 is disposed concentrically in the center of the outer and inner stationary contacts, 402 and 404 respectively, and is used for quickly moving the low mass disk 408 away from the contacts, thus opening current path 100.

Figure 9:
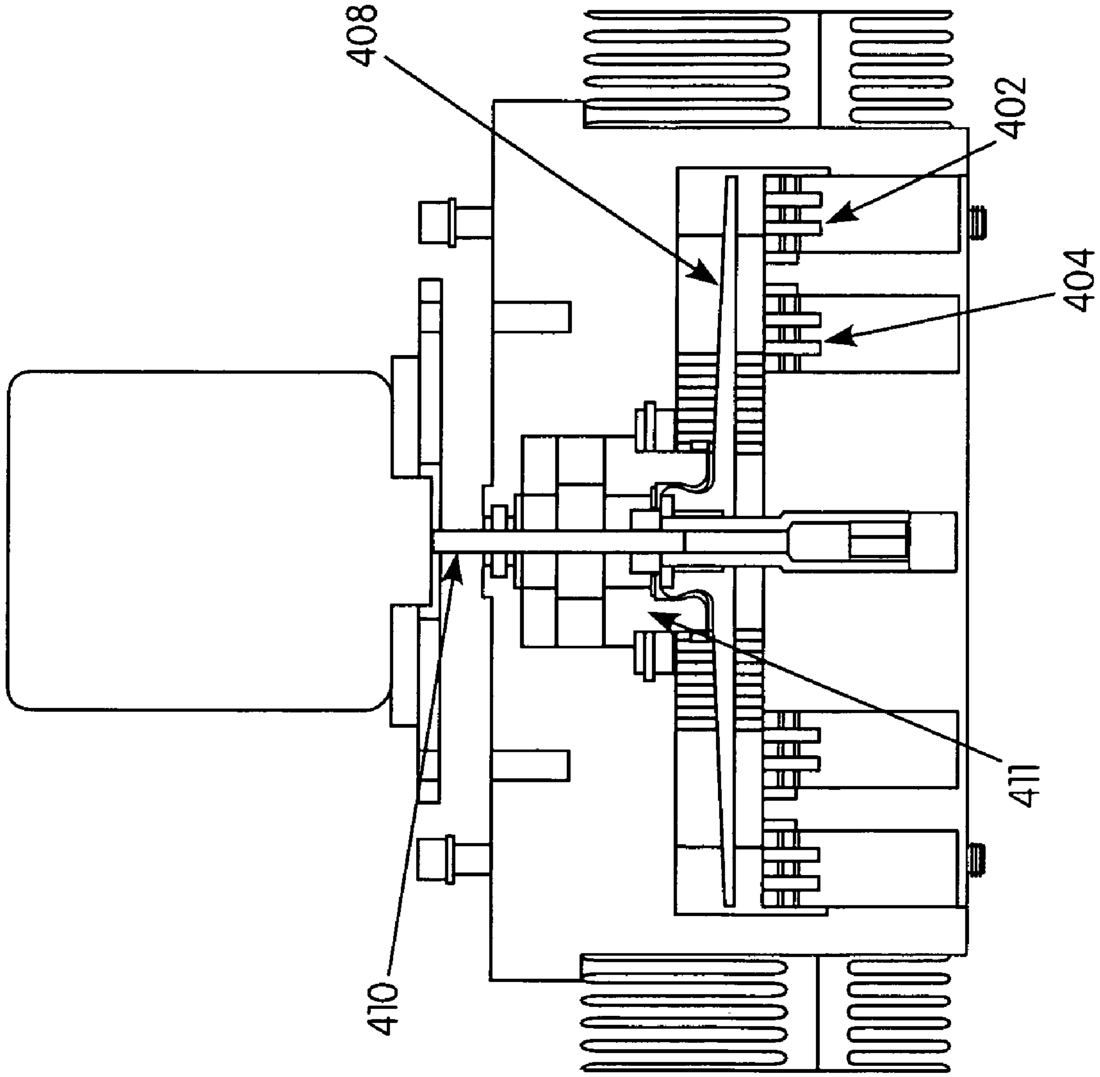
FIG. 9 is a cross sectional view of the mechanical contactor mechanism.

Contactor 102 is shown in cross-sectional view in FIG. 9. In normal operation, disk 408 is in contact with both sets of stationary contacts 402 and 404. Once a fault has been detected, pancake coil 406 is energized by dumping the charge stored in capacitor 302 into pancake coil 406, thereby driving disk 408 away from contacts 402 and 404, breaking the electrical connection between them. Disk 408 slides along rod 410 and is caught by a mechanical catch mechanism 411, which serves to hold disk 408 away from contacts 402 and 404. To engage the contact, mechanical catch mechanism 411 is released and disk 408 is driven into contact with contacts 402 and 404 via a solenoid acting on rod 410. Disk 408 is held in place during normal operation by a mechanical spring force, not shown in FIG. 9.

The novel aspects of the contactor mechanism 102 include the concentric configuration of stationary contacts 402 and 404 and pancake coil 406, and the low mass of moveable disk 408 which allows the disk to be driven away from contacts 402 and 404 in a very short period of time. Prior art mechanical contactors utilizing a Thompson drive typically have the contactor disk attached to a piston, such that the pancake coil must drive the mass of both the piston and the disk. In the contactor of the present invention, disk 408 slides along rod 410. As such pancake coil 406 is only required to drive the mass of disk 408 when it is energized.

Figure 10:
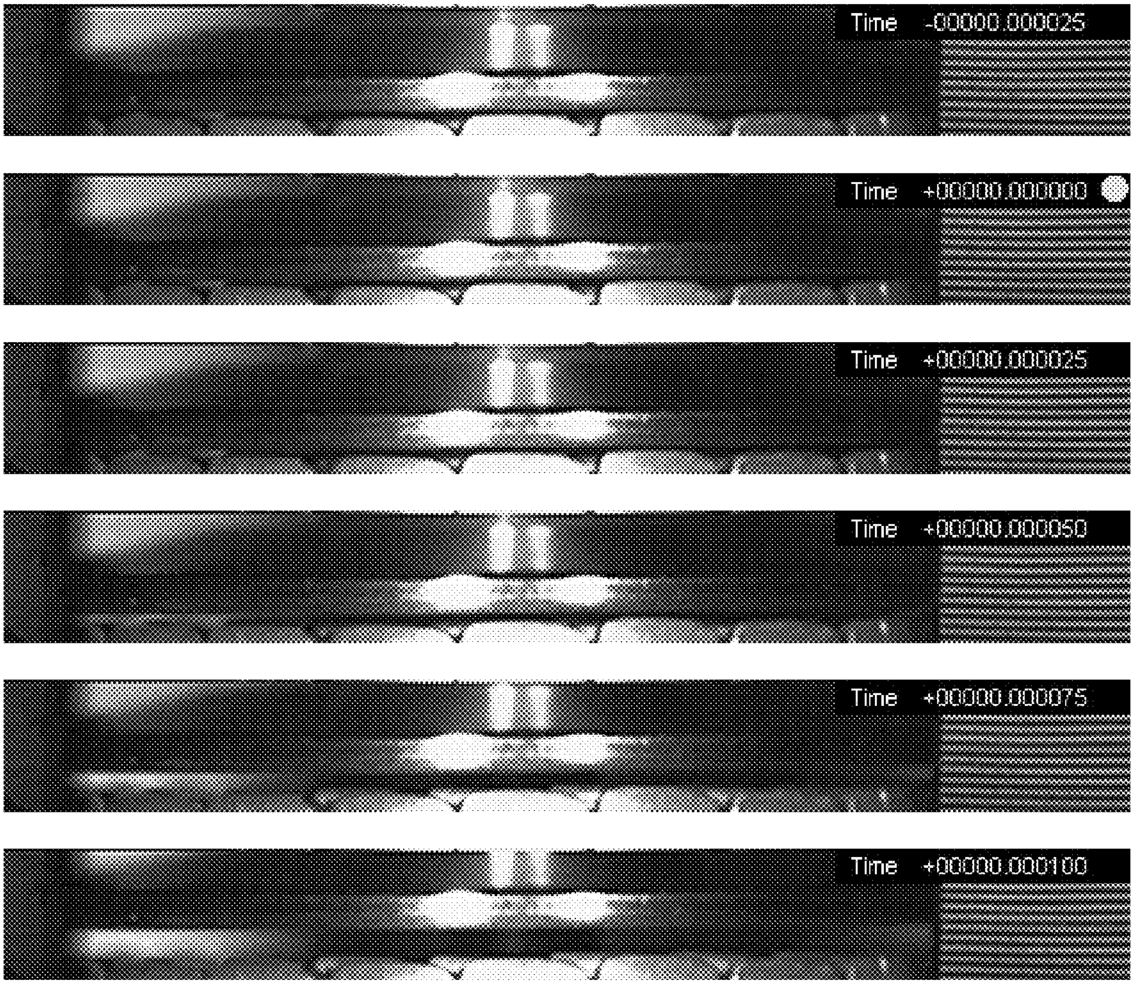
FIG. 10 shows a series of time-lapsed photographs showing the disk of the mechanical contactor moving away from the contacts.

FIG. 10 shows a series of time-lapsed photographs showing the movement of disk 408 away from the contacts as a function of time. (Note that, in FIG. 10, only outer contacts 402 can be seen.) As can be seen, disk 408 is completely separated from the contacts at the 100 microsecond mark. Therefore, once a fault has been detected by the detection circuitry, the current can be interrupted by the power electronics 202 within 100 microseconds.

Figure 11:
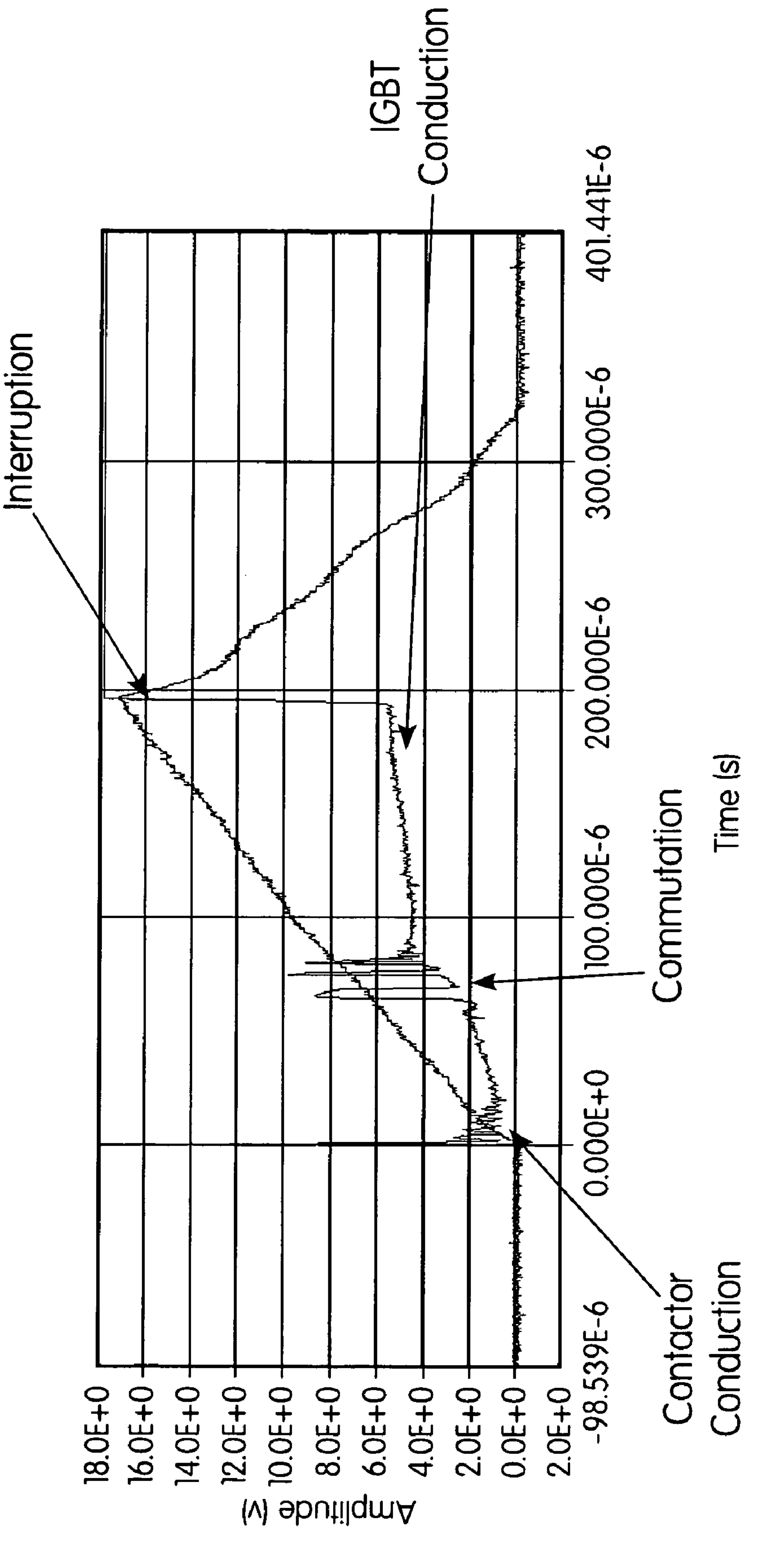
FIG. 11 is a graph of voltage and current versus time, showing the various stages of the fault interruption process.

FIG. 11 is a graph showing both voltage and current over time throughout the entire fault interruption process. (Note that the scale for the current in this graph is 100 times the scale for the voltage shown on the left side of the graph). The fault in FIG. 11 starts at time zero and mechanical contactor 102 is conducting the current. At around the 50 microsecond mark, commutation starts. Within that 50 microseconds, the fault was detected and the Thompson drive coil was energized to launch disk 408 away from contacts 402 and 404 of mechanical contactor 102. By about the 80 microsecond mark, the current is completely commutated and is being conducted by power electronics 202. The entire commutation process takes approximately 30 microseconds. The voltage during that time never exceeds about 10 volts, which is not large enough to cause arcing in the gap between stationary contacts 402 and 404 and moveable disk 408. It is estimated that at least 15 v would be needed for arcing to occur. Note that the normal voltage drop between the supply side and the load side through mechanical contactor 102 is about 2 v. As a result, there is no arcing during the commutation process.

During the period between about 80 microseconds and 195 microseconds, power electronics 202 are conducting the fault current. At a little after the 195 microsecond mark, the power electronics are switched off and the current is interrupted. Thus, the entire process from start of the fault to interruption of the current has taken less than 200 microseconds.

Figure 12:
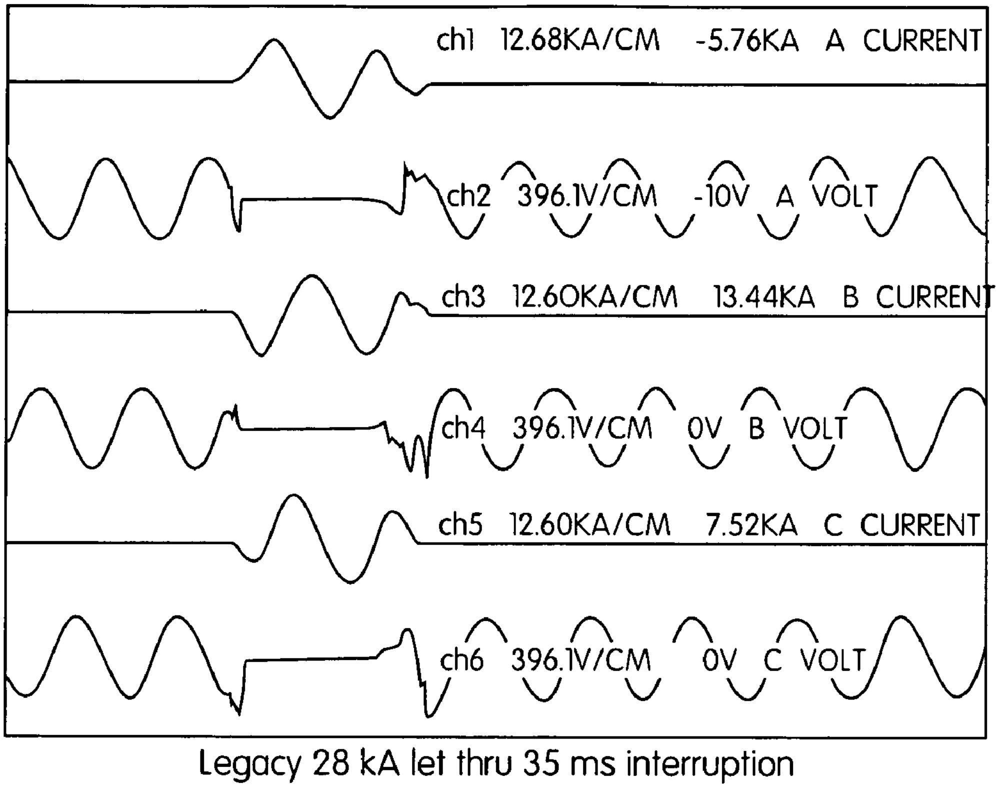
FIG. 12 is a graph showing the voltage and current during a fault for both legacy systems and for the device of the present invention.
Figure 12:
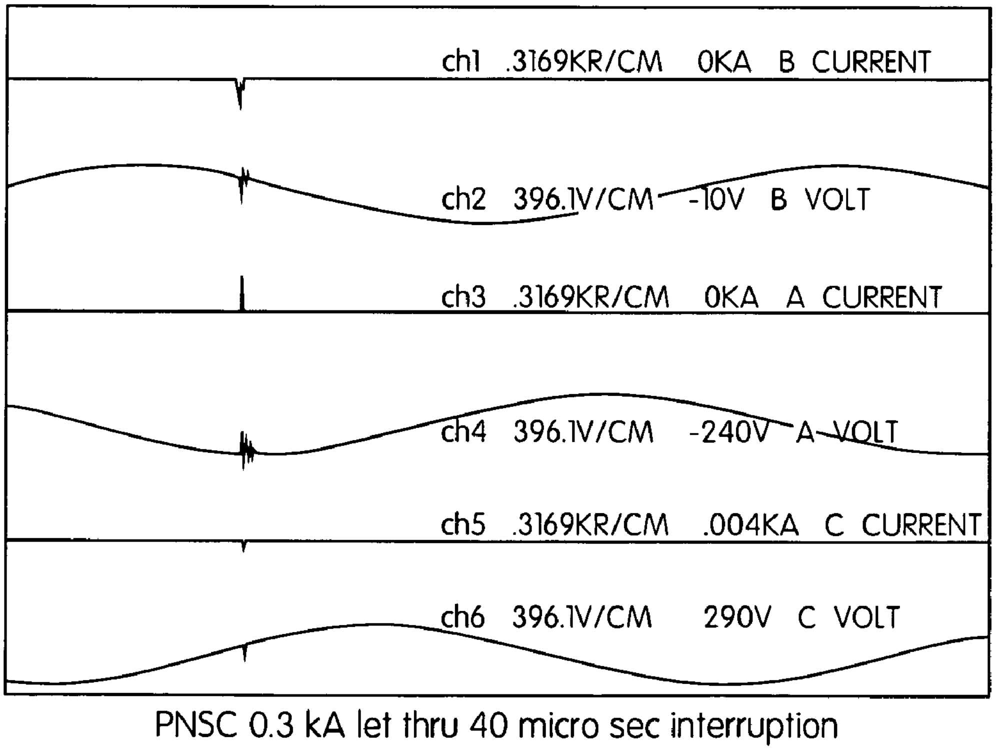

FIG. 12 shows a graph of both current and voltage for three phases of a system for both legacy prior art systems and for the power node switching center of the present invention when closing on a faulted circuit. As can be seen in the legacy system, for a 20 kA rms available fault current, the interruption process takes about 2 cycles or about 35 milliseconds. During this time period, the voltage has dropped to zero and the upstream system has been subjected to a 28 kA fault current. Using the present invention, the fault current is limited to about 0.3 kA and the interruption of the voltage to other loads has been limited to about 40 microseconds. This represents an approximate thousand fold improvement over the prior art systems.

While the general concepts of the power node switching center have been outlined herein, the specific implementation details are meant to be exemplary only and not part of the invention. It should be readily realizable to one of ordinary skill in the art that many different implementations are possible and still remain within in the spirit of the invention. This entire scope of the invention is defined by the claims which follow.

We claim:

1. A circuit interrupting device comprising:

a. a first current path, traversing a mechanical contactor;

b. a second current path, parallel to said first current path, traversing a power electronics switch; and c. fault detection circuitry, for detecting a fault condition, said fault detection circuitry comprising;

a current detector;

a high gain, narrow bandwidth integrator, coupled to the output of said current detector; and a first level detection circuit, coupled to the output of said narrow bandwidth integrator, for producing a fault signal when a fault condition is detected;

d. wherein a fault current is commutated from said first current path to said second current path upon detection of said fault current by said fault detection circuitry.

2. The device of claim 1 wherein:

said electro-mechanical contactor is opened when said fault detection circuitry detects a fault condition; and said power electronics switch is shut down as soon as possible after said commutation of said fault current.

3. The device of claim 1 wherein the bandwidth of said narrow bandwidth integrator is in the range of 10 kHz to 100 kHz.

4. The device of claim 1 wherein a fault signal is produced when the response of said narrow bandwidth integrator exceeds a predetermined level.

5. The device of claim 4 wherein said narrow bandwidth integrator produces a response to line frequency current that is below said predetermined level.

6. The device of claim 5 wherein said predetermined level of said first level detection circuit is adjustable.

7. The device of claim 1 further comprising:

a low gain, wide bandwidth integrator for sensing line frequency current; and a second level detection circuit, coupled to the output of said wide bandwidth integrator, for sensing line frequency current and for producing a fault signal when a fault condition is detected.

8. The device of claim 7 wherein a fault signal is produced when the response of said wide bandwidth integrator exceeds a predetermined level.

9. The device of claim 8 wherein said predetermined level of said second level detection circuit is adjustable.

10. The device of claim 9 wherein said current detector is a high frequency, narrow band current detector that can detect current components with frequencies between 10 kHz and 100 kHz and which is insensitive to line frequency current.

11. The device of claim 9 wherein said current detector is a Rogowski Coil.

12. The device of claim 1 wherein said power electronics switch comprises a pair of IBGTs.

13. The device of claim 1 wherein said electro-mechanical contactor comprises:

a first pole, comprised of a plurality of first electrical contacts arranged in one or more concentric circles;

a second pole, comprised of a plurality of second electrical contacts, arranged in one or more concentric circles, said second pole also being concentric with said first pole;

a pancake coil, disposed concentrically with said first and said second poles; and an electrically conductive disk which can electrically close said contactor when in simultaneous contact with said first pole and said second pole.

14. The device of claim 13 wherein said pancake coil can cause said electrically conductive disk to move away from said first and said second poles with a magnetically repulsive force, thereby electrically opening said contactor.

15. The device of claim 14 further comprising a discharge circuit for energizing said pancake coil to create said repulsive magnetic force.

16. A circuit interruption device comprising:

a first current path, traversing an electro-mechanical contactor;

a second current path, parallel to said first current path, traversing a power electronics switch;

a current detector;

a high gain, narrow bandwidth integrator, coupled to the output of said current detector;

a first level detection circuit, coupled to the output of said narrow bandwidth integrator, for producing a fault signal when the response of said narrow bandwidth integrator exceeds a predetermined level;

a low gain, wide bandwidth integrator, coupled to the output of a Rogowski coil, for sensing a line frequency current; and a second level detection circuit, coupled to the output of said wide bandwidth integrator, for producing a fault signal when the response of said wide bandwidth integrator exceeds a predetermined level;

wherein a fault current is commutated from said first current path to said second current path upon detection of said fault current by said fault detection circuitry.

17. The device of claim 16 further comprising a low-inductance electrical pathway connecting said first and said second current paths.

18. The device of claim 17 wherein said low-inductance electrical pathway comprises a laminated, low-inductance bus.

19. The device of claim 17 wherein said fault current is commutated from said first current path to said second current path when said electro-mechanical contactor is opened and further wherein said fault current is interrupted when said power electronics switch is opened.

20. The device of claim 19 wherein a fault current can be detected within about 50 microseconds of the occurrence of a fault.

21. The device of claim 20 wherein said fault current can be commutated from said first current path to said second current path within about 100 microseconds of the occurrence of a fault.

22. The device of claim 21 wherein said fault current is completely interrupted within about 300 microseconds of the occurrence of a fault.

23. The device of claim 22 wherein said current monitor is a Rogowski Coil.

* * * * *